United States Patent [19]
Kent et al.

[11] 3,851,955
[45] Dec. 3, 1974

[54] APPARATUS FOR CONVERTING MOTION PICTURE PROJECTORS FOR STEREO DISPLAY

[75] Inventors: Arthur P. Kent, Kew Gardens; Mortimer Marks, Beechhurst, both of N.Y.

[73] Assignee: Marks Polarized Corporation, Whitestone, N.Y.

[22] Filed: Feb. 5, 1973

[21] Appl. No.: 329,733

[52] U.S. Cl. .................................. 352/60, 350/132
[51] Int. Cl. .......................................... G03b 35/08
[58] Field of Search ........ 352/57, 60; 350/130, 132, 350/133, 137, 138, 139, 143

[56] References Cited
UNITED STATES PATENTS
2,268,338  12/1941  Kober .................................. 352/57
2,314,174  3/1943  Steinman .......................... 350/130 X
2,329,294  9/1943  Ramsdell .......................... 352/57 X
3,189,915  6/1965  Tondreau .............................. 352/60

*Primary Examiner*—Monroe H. Hayes

[57] ABSTRACT

Stereo pairs which have been printed on a single film strip are directed and focused upon a screen by an attachment for a standard motion picture projector. The images are overlapped upon the screen by abutting prisms with each of the images polarized at right angles to the other, without substantial light loss. The stereo pairs on the film are separated by an opaque band to define the edges of the projected image and mask the prism abutment.

8 Claims, 13 Drawing Figures

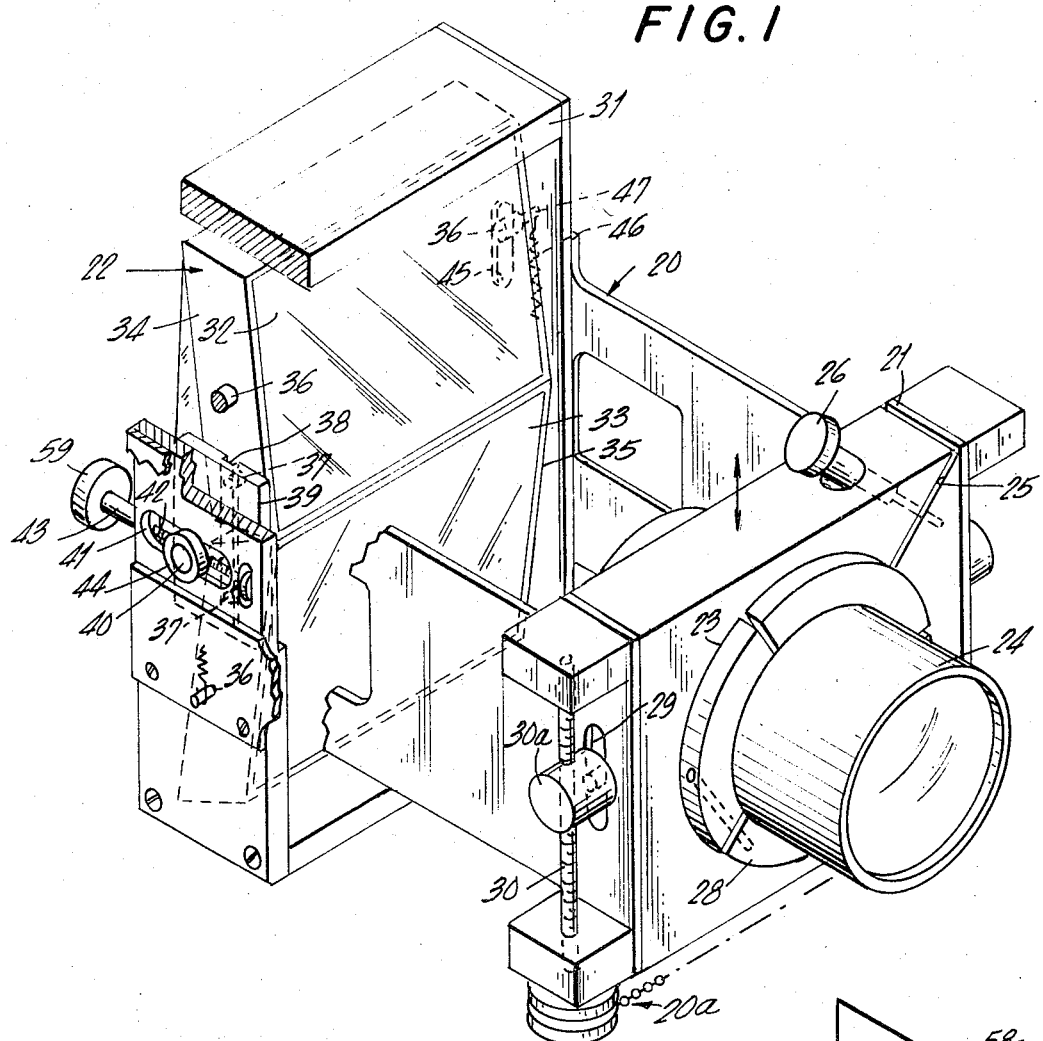
FIG. 1
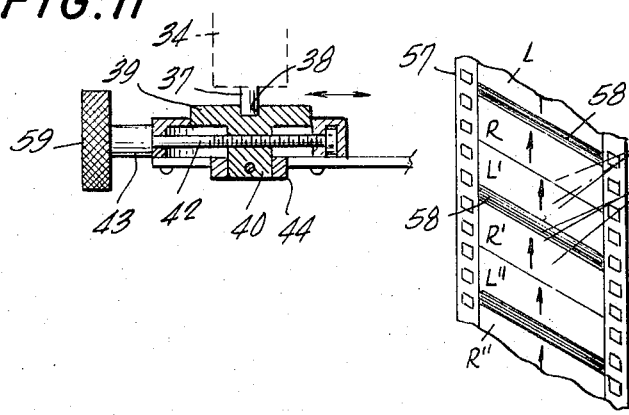
FIG. 11
FIG. 12

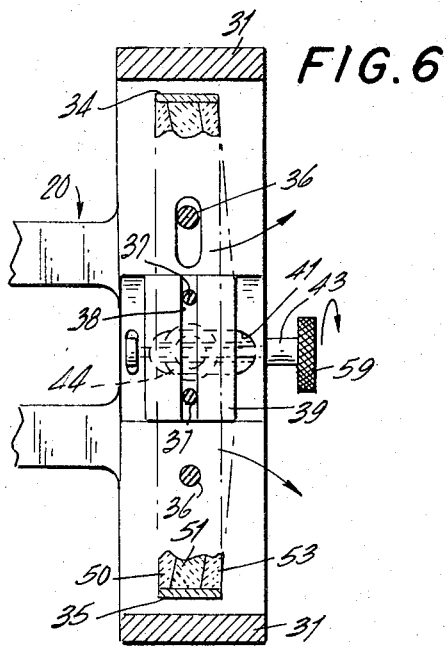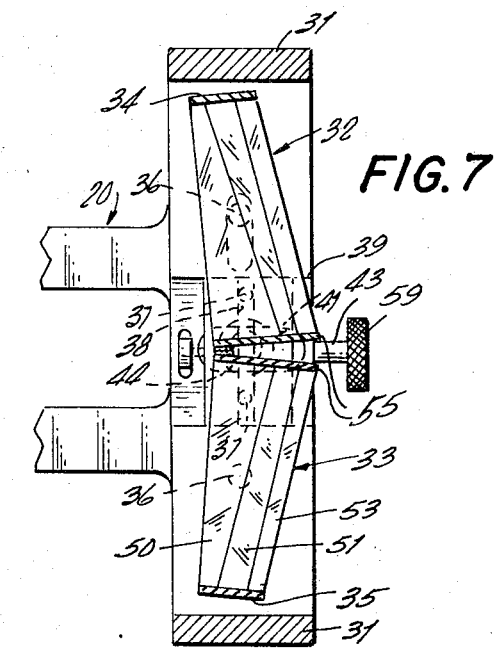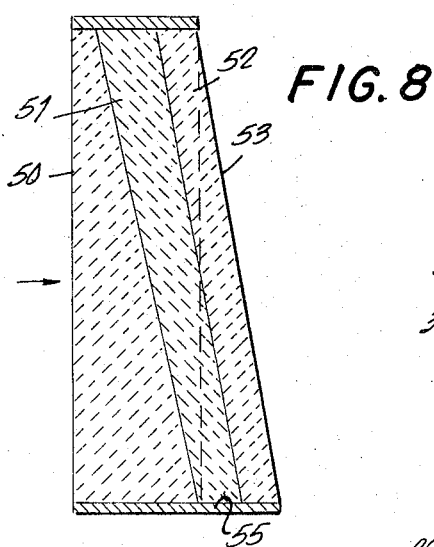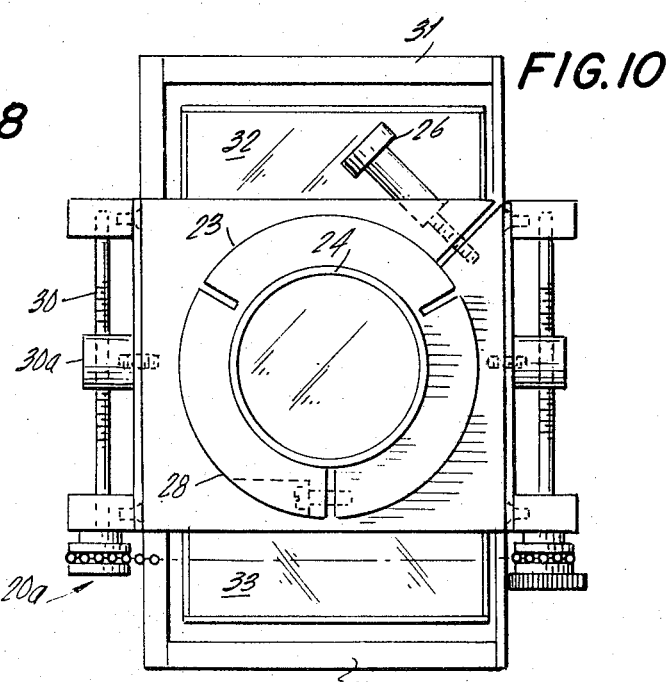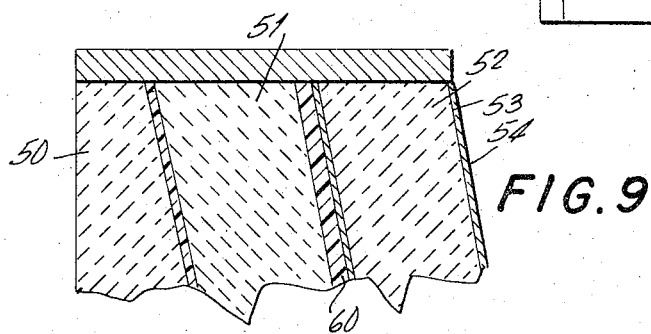

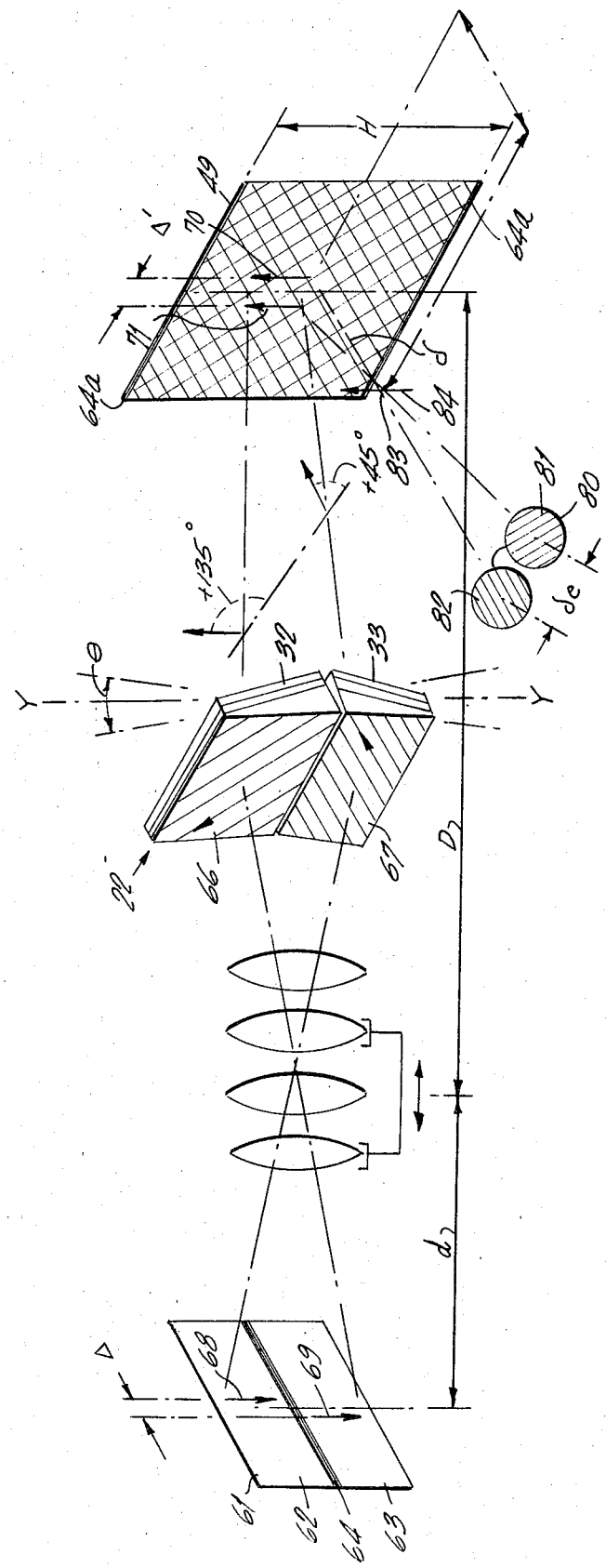

APPARATUS FOR CONVERTING MOTION PICTURE PROJECTORS FOR STEREO DISPLAY

BACKGROUND OF THE DISCLOSURE

Stereoscopic motion pictures have been displayed by simultaneously projecting right and left stereo images upon a screen in overlapped relationship while transmitting the light of each image through mutually extinguishing filters, and viewing the overlapped images on the screen through the same mutually extinguishing filters. These filters may comprise colored filters such as red and green, or polarizing filters disposed with their planes of polarization normal to each other.

Prior art devices have used two projectors and two film strips to overlap the projected stereo images upon the screen, one projector having the film for right eye images and the other for left eye images. In the two projector systems, the images were difficult to synchronize, adjustment of the position of the overlapped images was time consuming, the image light intensities were frequently out of balance. Such systems also necessitated the additional expenses of twice as much film as standard motion pictures, extra handling in the projection booth, frequent monitoring, etc. As a result of these technical difficulties and extra costs, the two projector stereoscopic process has seldom been used by the motion picture industry.

It has been proposed to print left and right motion picture stereo pictures on a single film frame and to project them simultaneously using a single projector. The stereo pictures may be printed side by side upon the film or one above the other. Mirrors and other optical devices have then been employed to bring the two images into overlapping relationship upon the screen. Such optical devices, however, have been responsible for substantial light loss resulting in dull, unsatisfactory projection. Moreover, prior art optical devices employed for stereo projection of single strip stereo images are bulky, difficult to adjust and often require substantial modification for use with the standard motion picture projector.

Accordingly, it is an object of the present invention to provide a stereo conversion system for standard motion picture projectors which will permit the projection of stereoscopic images from a single film strip with little light loss and a minimum of inconvenience and modification of the projector.

Another object of the present invention is to provide a stereo conversion system for a motion picture projector which will convert the light coming from each of the projected stereo images on a single frame into polarized beams having their planes of polarization normal to each other and in overlapping relationship upon the screen.

A further object of the present invention is to provide a compact, easily adjusted stereo conversion system for standard motion picture projectors, adaptable to the range of projection lenses of different foci, for the ranges of throw distance and screen sizes usually encountered in motion picture theatres.

Still another object of the present invention is to eliminate the distracting fringe images at the edges of the projection resulting from the two stereo images superimposed upon a screen.

SUMMARY OF THE DISCLOSURE

In one embodiment of the present invention a housing is secured to the projection lens of a standard motion picture projector. The projector is supplied with a motion picture film having a series of abutting stereo pairs thereon. Light from the stereo pairs is directed through two prisms carried by the housing. The prisms are adjustably mounted to enable the stereo pairs to be brought into overlapping relationship upon a theater screen. Light polarizing filters are incorporated within each of the prisms with their planes of polarization at 90° with respect to each other. The prisms are disposed within the housing in close proximity to each other and abutting along one margin.

To accommodate the prism assembly to various screen throw distances and screen sizes, the conventional projection lens is supplemented or replaced by a zoom lens, whereby focus may be re-established along with precise positioning of the overlapped images upon the screen.

The film is printed with an opaque band between the stereo pairs of a single frame. When the pairs overlap the opaque band forms a sharp black edge for the image such as a conventional projection would produce. In addition, any optical interference due to the meeting edges of the prisms in front of the projector are masked by the opaque band.

DESCRIPTION OF THE DRAWINGS

In the accompanying drawings forming part hereof, corresponding parts have been given the same reference numerals, in which drawings:

FIG. 1 is a somewhat isometric view, partly broken away, of the projector attachment assembly of the present invention.

FIG. 6 is a view taken on line 6—6 in FIG. 4.

FIG. 7 is a view taken on line 7—7 in FIG. 4.

FIG. 8 is a view in vertical section of one of the prisms used in the present invention, somewhat enlarged.

FIG. 9 is a fragmentary sectional view, on an enlarged scale of the prism shown in FIG. 8.

FIG. 10 is a view of the stereo projection converter taken from the rear or projector end thereof.

FIG. 11 is a view taken on line 11—11 of FIG. 3.

FIG. 12 is an elevational view of a portion of a motion picture film for use in conjunction with the apparatus of the present invention, showing the manner in which the stereo pairs are overlapped upon a screen.

FIG. 13 is a somewhat diagrammatic view of the complete optical system according to the present invention.

GENERAL DESCRIPTION

Figure 2:
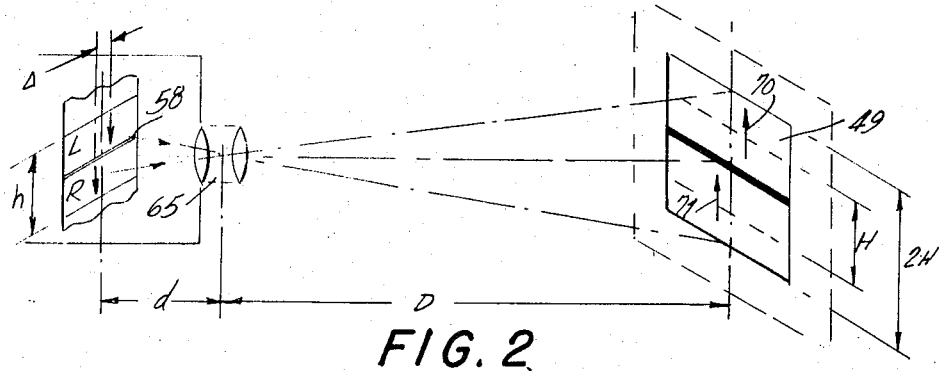
FIG. 2 is a diagrammatic view in side elevation showing the manner in which a stereo pair would be projected upon a screen by a standard motion picture projector in the absence of the prisms employed in the present invention.

Referring to the drawings and particularly to FIG. 1, there is shown a stereo projection converter 20 for attachment to a motion picture projector. The converter is carried within a substantially "T" shaped housing having a lens attachment block 21 at the rear or projector end thereof and a prism assembly 22 at the front.

The lens attachment block 21 is preferably rectangular and centrally bored as indicated at 23 to receive a lens 24 therethrough. The block 21 is of substantial thickness to provide a good bearing surface for the lens 24. A slit 25 is cut through the block 21 from its periphery to the bore 23. The block is also bored and threaded to receive a tightening screw 26 by means of which the block 21 may be firmly secured to the lens 24.

The lens 24 may be the lens of the motion picture projector 27 or an auxiliary lens 24a, as hereinafter more fully described, which in turn is secured to the projector lens. A split collar 28 may be used around the lens 24 to positively establish the longitudinal position of the block 21 upon the lens 24.

The housing 20 is vertically adjustable with respect to the block 21 and the optical axis of the projector lens system by means of a chain and pulley drive 20a, the slot 29 in the housing and the adjusting screw 30 and traveller 30a which extends through the slot and is threaded into the block 21. One slot 29, adjusting screw 30 and traveller 30a are provided on each side of the housing 20.

The front of the housing 20 is in the form of a rectangular frame 31 within which two prisms 32, 33 are swingably carried. Each of the prisms are secured within holders 34, 35 which extend around the prism margins. Short, outwardly extending stub shafts 36 are carried by the prism holders 34, 35 on each side thereof. The stub shafts 36 are received by the frame 31 and provide pivots upon which the prisms can swing.

As shown in FIGS. 1-4 the prisms 32, 33 are disposed in abutting relationship with their inner margins touching. In the embodiment illustrated, the prisms are oriented for use with a single strip film in which the stereo pairs are disposed one above the other as shown in FIG. 12. It is within the purview of the present invention, however, to employ single strip stereo film in which the stereo pairs are laterally disposed, in which event the housing 20 and the prisms 32, 33 would be rotated 90° from the position shown in FIG. 1.

Each of the prism holders 34, 35 is provided with a small, outwardly extending pin 37 between one of its stub shafts 36 and the margin of the holder which contacts the other prism holder. The pins 37 are received within the elongated slots 38 of a small flat block 39 (see FIGS. 1 and 3). The block 39 is carried between the inner surface of the frame 31 and the outer faces of the prism holders 34, 35.

An outwardly extending arm 40, best shown in FIG. 11, is received within an elongated horizontal aperture 41 in the frame 31. The arm 40 is transversely bored and internally threaded to receive the threaded portion 42 of a prism control member 43. A small roller 44 is freely secured to the end of the arm 40 where it extends beyond the aperture 41 to guide the movement of the block 39 as the knob 59 on the control member 43 is rotated. As the block 39 moves in response to the action of the control member, the pins 37 are urged either toward or away from the projector 27, depending upon the direction of travel. Movement of the pins 37 results in a corresponding movement of the prism holders, and consequently the prisms, upon the shafts 36. In this manner, the prisms can be swung so as to bring the images projected through them into overlapping relationship upon the screen (see FIGS. 6 and 7).

Since the prisms 32, 33 have a certain amount of thickness as shown in FIG. 8, and the prism holders 34, 35 embrace the prisms, it will be apparent that some movement relative to each other must be provided. In addition, the prisms must be held in contact with one another along their inner margins and in line with the optical axis of the system to prevent projection problems. The manner in which this is accomplished is shown in FIGS. 1, 4 and 5.

Figure 5:
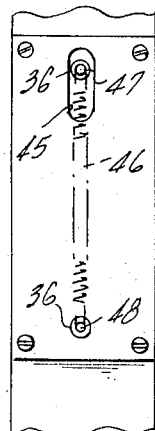
FIG. 5 is a fragmentary view taken on line 5—5 in FIG. 4.
Figure 4:
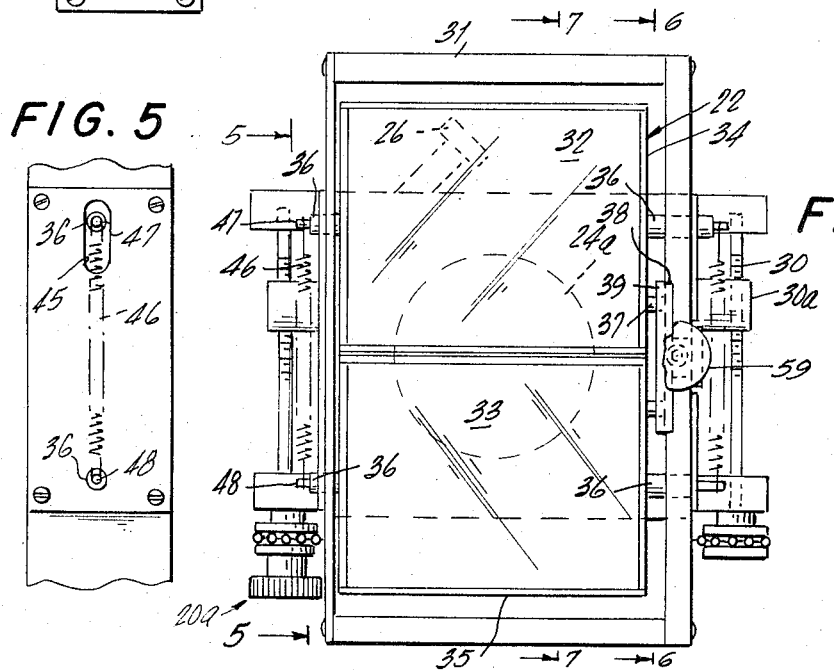
FIG. 4 is a view in front elevation of the stereo projection converter shown in FIG. 3, partly broken away.

It will be seen in FIGS. 1, 4 and 5 that the stub shafts 36 of the upper prism holder 34 are received within an elongated slot 45 in the frame 31. A coil spring 46 is secured at one end to a reduced diameter portion 47 of the stub shafts 36 and at its opposite end to a reduced portion 48 of the stub shaft 36 on the lower prism holder. The spring 46 is loaded so as to urge the prisms together at all times. In order to prevent skewing, the same spring arrangement is provided on each side of the frame 31.

As the prism holders are swung by the control knob 59 in bringing the images into overlapping relationship upon the screen 49, the upper prism holder 34 and its prism 32 can move upwardly or downwardly depending upon the direction of travel without separating the prisms.

When projecting a motion picture film in which the stereo pairs are upon the same frame of the film it is essential to provide as much light as possible to insure an attractive and acceptable display. Since the light output of a standard motion picture projector is limited, adequate light for stereo projection employing a single film strip must be achieved by the reduction of light loss through the stereo converter. In the present invention light losses are minimized by the use of a novel prism arrangement, best shown in FIGS. 8 and 9.

The prism arrangement shown in the drawings comprises a first component of an achromatic prism 50 of high index glass such as flint glass laminated to a second component 51 of the achromatic prism of high index glass such as crown glass. A specific example of an achromatic prism is given by the following combination:

|  | Red C | Yellow D | Blue-Green F |
|---|---|---|---|
| Flint glass | 1.630 | 1.635 | 1.648 |
| Crown glass | 1.527 | 1.530 | 1.536 |

It is preferred that the overall mean index of the prism be of the order of 1.60 to 1.9 so as to obtain a thinner, more compact prism to achieve a given deviation. A linear light polarizing film 50 having a thickness of 0.3 – 0.4 mil and a light transmission of 39 to 40 percent is next laminated directly to the front or exit surface of the second prism 51 and a protective glass plate 52 is cemented over the polarizer by means of a suitable layer of an optical grade adhesive having high transparency. Since the prisms will heat up during projection, the location of the polarizer is important in prevent strains in the prisms from appearing as distracting patterns in the projected images. The exterior surface 53 of the glass plate 52 is coated with an anti-reflecting coating 54 such as magnesium fluoride. The construction of the prisms 32, 33 are identical but they are oriented with their broad bases 55 abutting each other as shown in FIGS. 2 and 7.

Figure 3:
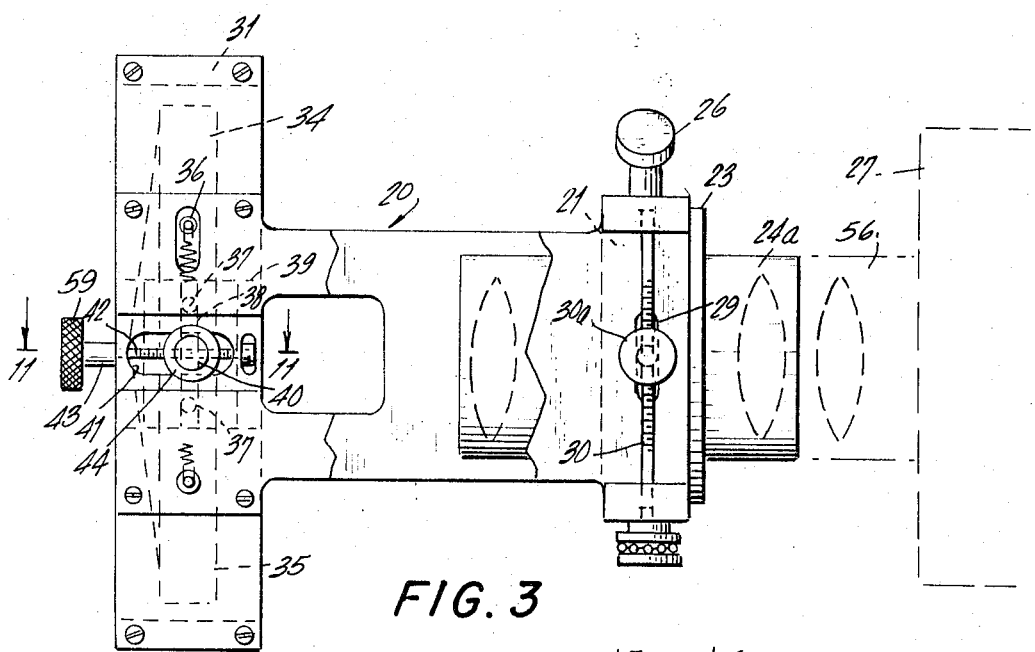
FIG. 3 is a view in side elevation, partly broken away, showing the stereo projection converter of FIG. 1 attached to a projection lens.

In order to fill the screen 49 when the stereo pairs, which are each one half the size of the standard frame, are projected in overlapping relationship, it may be necessary to interpose a wide angle lens or a zoom (vari-focal) lens 24a between the projector lens 56 and the prisms 32, 33 as shown in FIG. 3 or substitute a zoom lens for the projector lens. The lens attachment block 21 is suited for this purpose. It is also within the purview of the present invention to take the stereo pictures through an anamorphic camera lens and thereafter project them through a lens such as a cinemascope lens, well-known in the art.

As will be seen from an examination of FIG. 4, a horizontal obstruction is formed across the beam of light coming from the projection lens 56. This obstruction, consisting of the abutting edges of the prism holders 34, 35 would create a distracting line in the projected image. In addition, since the stereo pairs do not bear identical information due to their left-right displacement, they cannot be brought into register but will display unattractive fuzzy edges at the top and bottom of the picture. It has been found that both of these problems can be overcome, however, by printing the stereo pairs on the film in the manner shown in FIG. 12.

The film 57 used in the present invention consists of a series of stereo pairs LR, L'R', L"R" separated by an opaque band 58. The opaque band is of the order of 1 to 2mm wide or 10 to 12 percent of the frame width and serves to mask the horizontal line formed by the abutting edges of the prism frames 34, 35. In addition, as shown in FIG. 12, when the stereo pairs are projected, the opaque band will appear as a sharp dark border 58a at the top and bottom of the image to mask the fuzzy edges which would otherwise be present.

In FIG. 13 there is shown diagramatically a complete optical system according to the present invention. A conventional film frame 61 modified according to this invention for stereo projection is shown at the left. The film frame 61 comprises a pair of images 62 and 63 one above the other arranged with a horizontal opaque bar 64 between them, the function of which will become clear from the subsequent explanation. A standard projection lens, focused at a distance d from the film plane projects an image at a throw distance D to a screen having a height H. A conventional film frame 61 has a height, $h = 18.8mm$ and in projection this is magnified to the screen height H. However, for the purposes of this invention, the projector lens 65 is selected to have a focal length such that the actual projection height is 2H. If projected without the prism assembly of the present invention the film frame 62 would appear as the lower projected image and the film frames 63 would appear as the upper projected image with a combined projected height of 2H. The prism assembly, however, brings the frames 62, 63 into overlapping relationship upon the screen with a projected height of H.

To produce the stereo effect, the stereo images indicated by the arrows 68 and 69 on film frames 62 and 63, respectively, are laterally displaced by a distance Δ which is approximately inversely proportional to the distance of the object to the camera lens, (not shown). The arrow 68 appears on the screen as the arrow 70 and the arrow 69 appears on the screen as the arrow 71. These images are also laterally displaced.

As disclosed above, the prism assembly 22 not only brings the image of the frames 62, 63 into overlapping relationship upon the screen but also polarizes the projected images so that their respective planes of polarization are at 90° to each other. This feature is indicated by the diagonal lines 66, 67 on the prisms 32, 33 which criss-cross on the screen 49. It is now apparent that the opaque or black bar 64 appears on the upper and lower edges of the screen 49 as a sharp black line 64a which effectively frames the images at these edges. If the black line were too narrow or nonexistent, portions of the overlapped images would appear along the edges and produce an undesirable distracting fringe.

The functioning of the device may be understood from FIG. 13 by the following: displaced stereo images indicated by the arrows 68 and 69 are projected upon the screen 49 as overlapped image pairs, 70 and 71. In projection, the image 70 is polarized at +45° and the image 71 is polarized at +135° and these images correspond to the right and left eye images, respectively. The viewer wears polarized spectacles 80 having a right eye lens 71 polarized at +135° and a left eye lens 82 polarized at +45°. Thus, the left eye lens will admit only the upper image 70 and the right eye lens will admit only the lower image 71 on the film.

Since the images are screen at the screen, the line of sight of these images crosses over in front of the screen plane at point 83 and the two arrows 68 and 69 are seen as a single object indicated by the arrow 84 which passes through point 83 at a distance δ in front of the schreen 49. The displacement of arrows 68 and 69 at the screen is Δ'. The interocular distance of the observer's eyes is $d_e$ and δ is the apparent distance of the object 84 from the screen 49.

The vertical line through the prism assembly yy' bisects the angle θ which is the angle between the front surfaces of the prisms. This angle θ is adjusted to control the vertical displacement of the overlapped image pairs into precise relationship.

In order to convert a standard motion picture projector to a stereoscopic projector employing the above described apparatus, it is merely necessary to attach the converter to the projection lens 56 of the projector by slipping it into the lens attachment block 21 or by coupling the lens 56 to the wide angle or zoom lens 24a in the manner indicated in FIG. 3. Thereafter, with the film 57 threaded through the projector in operation, the control knob 59 is turned to bring the stereo pairs into overlapping relationship upon the screen. When viewed through spectacles having lenses of light polarizing material disposed with their planes of polarization normal to each other, the projected images will appear three dimensional.

From the foregoing it will be seen that there has been provided a stereo converter for standard motion picture projectors which is compact, easy to attach to the projector and which will produce a three dimensional display of a quality and brilliance superior to prior art devices.

Having thus fully described the invention what is claimed and sought to be protected by United States letters patent is:

1. Apparatus for producing stereo motion picture displays comprising in combination with a single film motion picture projector, a projection lens for said projector, a single film strip having a series of image frames with a pair of corresponding stereo images in each frame, an opaque band extending across the center of each frame for separating the images of the stereo pair along their abutting margins, said opaque hand having a width of 10 to 12 percent of the image frame, a hollow housing, means to secure one end of the housing to the projection lens, a prism assembly carried by the opposite end of the housing, said prism assembly comprising a first and a second angularly adjustable prism, said first and second prisms abutting each other at their inner edges, a light polarizer laminated to each of said prisms, the plane of polarization of the polarizer of the first prism being disposed normal to the plane of polarization of the polarizer of the second prism, said prism abutment being parallel to and in optical alignment with but spaced from the opaque band between the stereo pairs when they are being projected, said prisms each receiving one of the images of the stereo pair in each of the image frames and directing them in overlapped relationship together with the opaque band upon a screen with the plane of polarization of the two images of a stero pair being normal to each other and the opaque band at opposite edges of the screen.

2. Apparatus according to claim 1 in which the projector lens is a zoom lens.

3. Apparatus according to claim 1 in which a zoom lens is interposed between the projector lens and the prism assembly.

4. Apparatus according to claim 1 in which each of the prisms is carried by a hollow frame swingably secured to the housing and adjustable by a threaded adjusting screw coupled to the said frames.

5. Apparatus according to claim 1 in which the first and second prisms are achromatic prisms of high index glass.

6. Appparatus according to claim 1 in which each of the prisms comprises a lamination of a first component of an achromatic prism of a high index glass, a second component of an achromatic prism of a high index glass, a light polarizer carried by the second prism, a cover glass over the light polarizer and an anti-reflecting coating upon the outer surface of the cover glass.

7. Apparatus according to claim 6 in which the first achromatic prism component is formed of a high index glass, the second achromatic prism component is formed of a high index glass, said prisms having an overall mean index of the order of 1.60 to 1.9, and the light polarizer is of a thickness of 0.3 to 0.4 mil and a light transmission of 38 to 40 percent.

8. Apparatus according to claim 1 in which the prisms are disposed with their broader bases abutting each other.

* * * * *